June 20, 1967 E. F. GLASS ETAL 3,326,614
WHEEL MOUNTING
Filed March 19, 1965 2 Sheets-Sheet 1

INVENTORS
EMMETT F. GLASS
& JOHN K. HALE
BY Walter V. Wright
Agent

June 20, 1967  E. F. GLASS ETAL  3,326,614
WHEEL MOUNTING
Filed March 19, 1965  2 Sheets-Sheet 2

INVENTORS
EMMETT F. GLASS
& JOHN K. HALE
BY Walter V. Wright
Agent

United States Patent Office 3,326,614
Patented June 20, 1967

3,326,614
WHEEL MOUNTING
Emmett F. Glass, Akron, and John K. Hale, New Holland, Pa., assignors to Sperry Rand Corporation, New Holland, Pa., a corporation of Delaware
Filed Mar. 19, 1965, Ser. No. 441,233
2 Claims. (Cl. 308—189)

This invention relates to the mounting of wheels on an agricultural implement or the like.

For any given wheel mounting, the wheel bearings usually have a predetermined proper axial position on the spindle, within certain operating tolerance limits. Various assemblies of shims and spacer washers are commonly employed to establish proper axial positioning of the wheel bearings. These assemblies are usually clamped in place on a wheel spindle by a slotted head nut which is turned on a reduced diameter threaded end of the wheel spindle to a predetermined clamping position and then locked in place on the spindle by a cotter pin which extends through the slots of the clamping nut to prevent its inadvertent rotation. The cotter pin extends through a hole drilled transversely through the wheel spindle. The usual procedure is to draw the nut tight on the spindle to seat the bearings and then back the nut off a fraction of a rotation, as necessary, to align the nearest slot in the nut with the cotter pin hole in the spindle. The above mechanism is particularly important with the use of roller bearings having separable inner and outer bearing rings and an annular series of rollers interposed between the bearing rings. These bearing positioning assemblies include a plurality of small parts which are subject to being lost during repairs in the field. Many standard cotter pins fail after being inserted and removed a few times and are often a nuisance to replace. The cotter pin hole that must be provided in the wheel spindle is a troublesome step in the spindle manufacturing process and constitutes a potential stress concentration point in the spindle. The presence of the slotted head nut and cotter pin is a factor that must be considered and provided for in the designing and manufacturing of a mounting hub for the spindle, thereby further complicating the design of the wheel mounting assembly.

It is an object of this invention to provide a novel wheel mounting assembly for an agricultural machine or the like.

It is another object of this invention to provide a simply constructed, rugged, low-cost wheel mounting assembly.

It is another object of this invention to provide a wheel mounting assembly requiring a minimum number of parts and manufacturing steps.

It is another object of this invention to provide a wheel mounting assembly affording easy axial adjustment of the wheel bearings to their proper operative positions.

It is another object of this invention to provide a wheel mounting assembly wherein the wheel bearings are locked in their proper axial positions on the wheel spindle automatically upon attachment of the spindle mounting hub to the frame of an agricultural implement of the like.

These and other objects and advantages of this invention will be apparent upon reference to the following description and claims taken in conjunction with the accompanying drawings wherein:

Figure 1:
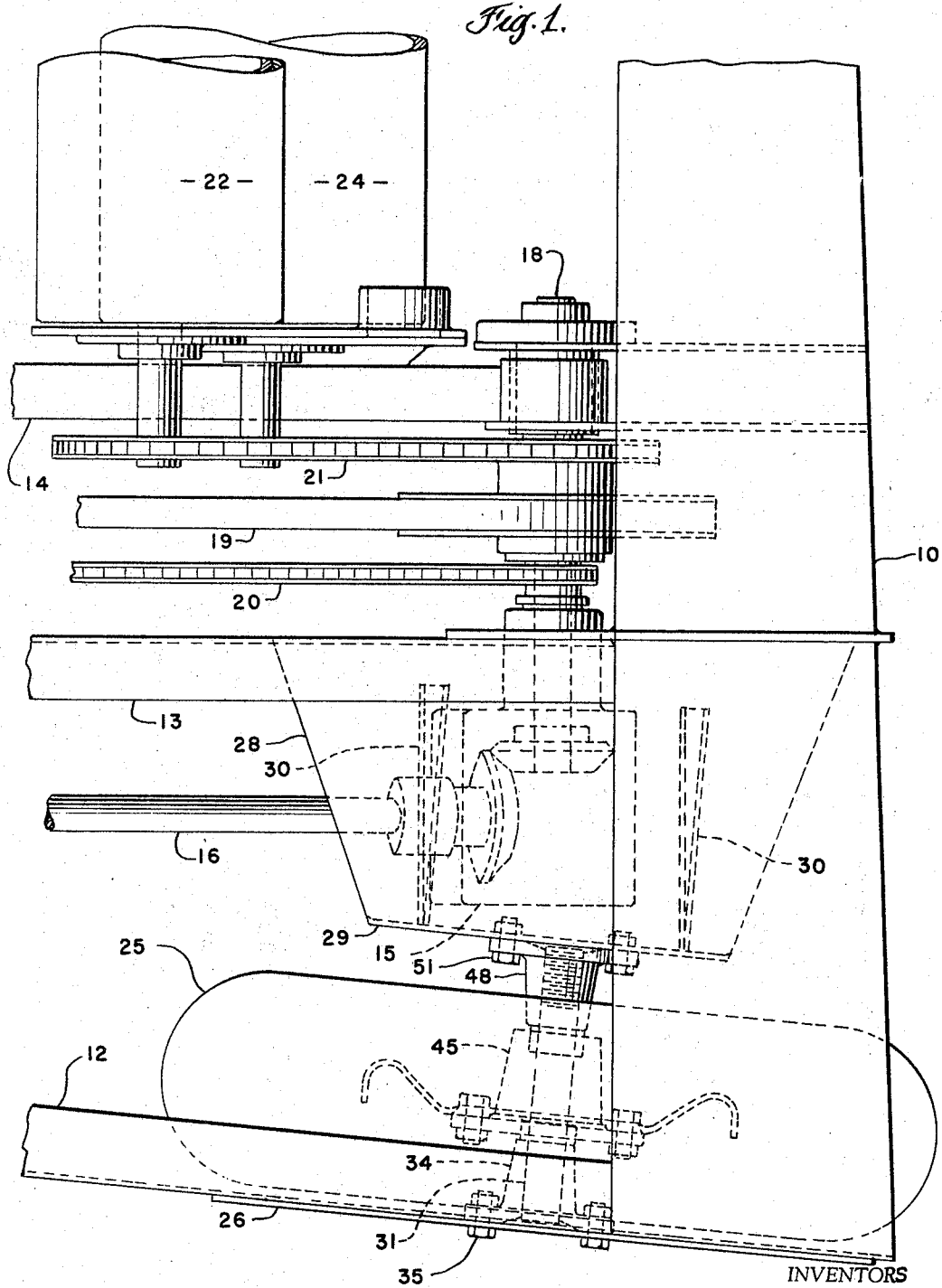
FIG. 1 is a fragmentary plan view of an agricultural machine embodying a wheel mounting assembly constructed in accordance with the principles of the present invention.

Referring now to the drawings in detail, FIG. 1 shows an agricultural implement adapted to be pulled through a field in the direction from right to left as seen in the plan view of FIG. 1. The implement has a transverse main frame member 10 extending across the rear thereof. Frame members, such as shown at 12, 13 and 14 extend forwardly from main frame member 10. A gearbox 15 is mounted on frame member 13 and has a forwardly extending input shaft 16 adapted to be connected to power-take-off means on the towing vehicle. A gearbox output shaft 18 drives various belts and chains 19, 20 and 21 to operate crop harvesting, or other mechanism such as the hay conditioning rolls 22 and 24 shown in FIG. 1. The particular function of the implement is of no particular concern to the present invention which is concerned solely with an assembly for mounting a ground engaging support wheel 25 on any implement frame.

In FIG. 1 it may be seen that a vertical frame plate 26 is carried on frame members 10 and 12 at the extreme left outboard side of the implement relative to the direction of travel. A frame plate 28 is carried by frame members 10 and 13 and extends downwardly at an angle from frame member 13 toward frame plate 26. Frame plate 28 overlies gearbox 15 and has a vertical depending flange 29 extending downwardly along the outboard side of gearbox 15. Reinforcing gussets 30 add rigidity to the frame plate 28 and its flange 29. It will be apparent from FIG. 1 that frame plate 26 constitutes an outboard wheel mounting frame member while the flange portion 29 of frame plate 28 constitutes the frame mounting member for the inboard side of ground wheel 25.

Figure 2:
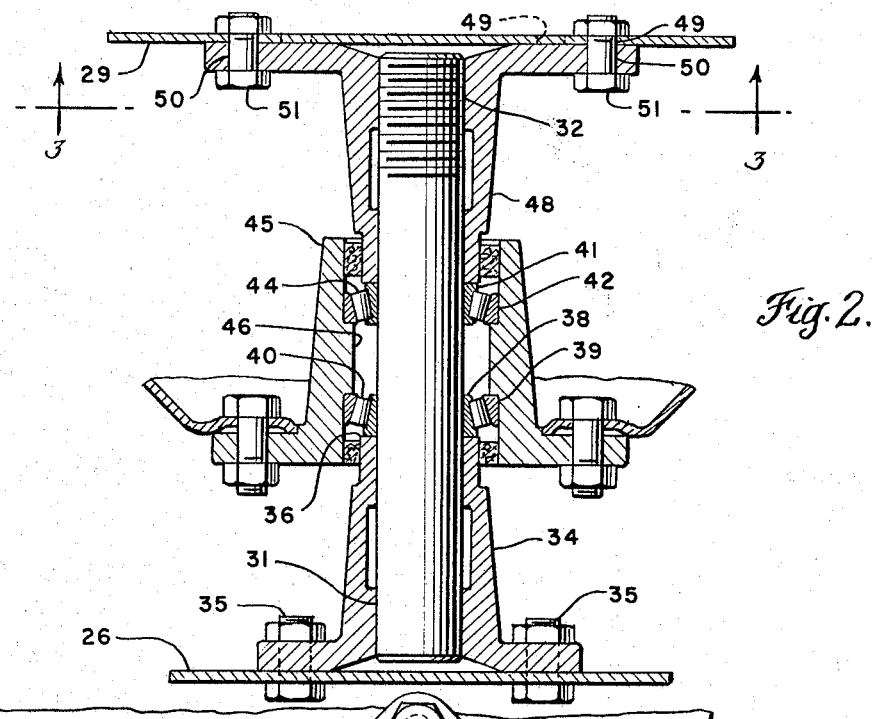
FIG. 2 is a longitudinal sectional view of the wheel mounting assembly seen in FIG. 1 to an enlarged scale.
Figure 3:
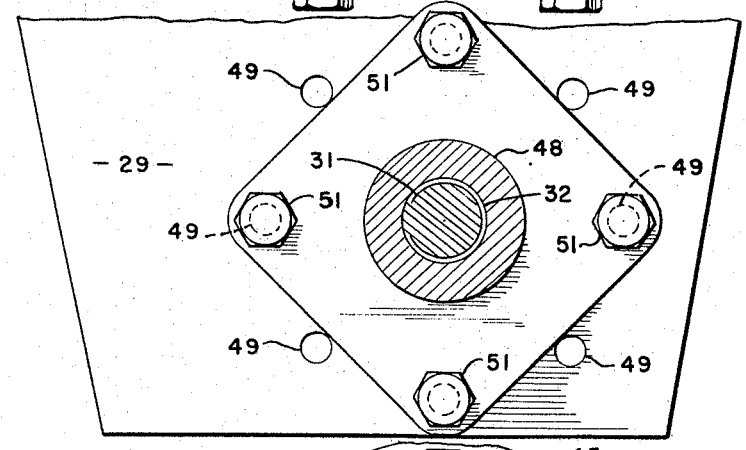
FIG. 3 is a sectional view taken on the line 3—3 of FIG. 2.
Figure 4:
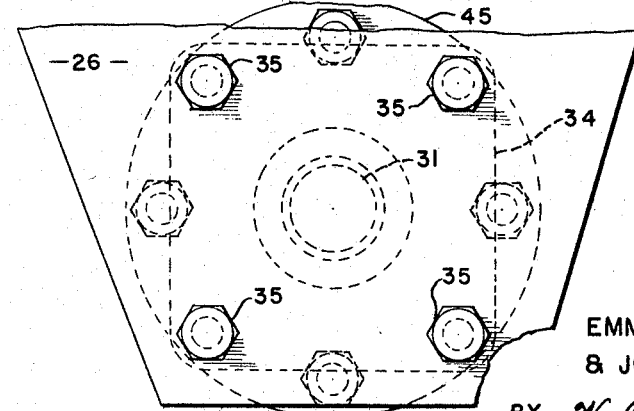
FIG. 4 is a fragmentary end view of the wheel mounting assembly looking toward the outboard end of the assembly from the side of the implement.

The wheel mounting assembly with which this invention is particularly concerned, and its relation to mounting plates 26 and 29, is better seen in FIGS. 2, 3 and 4. The wheel mounting assembly comprises a simple cylindrical spindle 31 having an externally threaded portion 32 adjacent one end thereof. The end of spindle 31 opposite the threaded portion 32 is fixedly carried in a first spindle mounting hub 34. Spindle 31 may be press fit, shrunk fit, or otherwise fixedly attached to hub 34. Hub 34 is fixedly attached by bolts to the wheel mounting frame plate 26. The inboard axial end of hub 34 constitutes a shoulder stop member 36 against which one axial side of the inner ring 38 of a tapered roller bearing abuts. The roller bearing has a radially outer annular ring 39 which is separable axially from inner ring 38. An annular series of tapered rollers 40 is interposed radially between inner and outer rings 38 and 39. Similar roller bearings having an inner ring 41, an outer ring 42 and an interposed annular series of rollers 44 may also be seen in FIG. 2. The respective inner rings 38 and 41 of the pair of bearings are carried on spindle 31 and freely slidable axially therealong. The outer rings 39 and 42 of the respective bearings are carried within the bore of a wheel hub 45. The outer bearing rings are each held against axial movement in one direction relative to hub 45 by virtue of the fact that they have their axially inner sides abutting the respective ends of a spacer ring, or shoulder, 46 formed within hub 45. A second spindle mounting hub 48 is internally threaded and received on the threaded end portion 32 of spindle 31 and abuts the axially outer side of the inner bearing ring 41. It will be apparent in FIG. 2, that the axial movement of second hub 48, accompanying rotation of the hub in one direction on the spindle threads, will effect axial movement of the inner bearing ring 41 into engagement with the associated bearing rollers 44 and outer ring 42. Axial movement of hub 48 toward hub 34 not only effects proper operative seating of the bearing elements 41, 42 and 44, but also effects proper seating engagement of the bearing elements 38, 39 and 40 since axial thrust from outer bearing ring 42 is transferred through the outer bearing ring stop 46 to outer bearing ring 39. This thrust seats rollers 40 between the outer bearing ring 39 and its associated inner bearing ring 38 since the inner bearing ring 38 is stopped by end shoulder 36 of hub 34. Thus, by the simple act of turning hub 48, both bearings may be seated and the wheel hub 45 axially centered on spindle 31. For proper operation, however, a certain amount of axial freedom or end play must be provided for the bearings. This may be accomplished by rotating hub 48 a fraction of a rotation in the direction to carry the hub axially away from fixed hub 34. Such an adjustment is provided for in the present invention, as may be seen in FIG. 3 by providing an annular series of eight bolt holes 49 in the frame plate 29. The axes of holes 49 lie on a circle concentric to the axis of spindle 31. The spindle mounting hub 48 is provided with four mounting bolt holes 50 (FIG. 2) whose axes lie on the same concentric circle as the axis of holes 49 when the hub is threaded on the spindle. Four mounting bolts 51 are provided for hub 48. Thus, as hub 48 is rotated about the axis of spindle 31, any of the bolt holes 50 therein may be aligned with any of the annular series of bolt holes 49 in frame member 29. In mounting the wheel spindle on the frame, hub 48 is turned onto the spindle to seat the roller bearings, then it is backed off the spindle to align the four hub bolt holes 50 with the angularly nearest four bolt holes 49. The mounting bolts 51 are then inserted in the aligned holes.

It will be obvious that the bearing tolerances will vary from one application to the next depending upon factors peculiar to the particular application. Thus, the number of holes 49 and 50 and mounting bolts 51 may vary from one application to the next within the basic spirit of the invention which is to provide means for fixedly attaching hub 48 to the frame member 29 substantially in any angular position about the axis of spindle 31 as required by the operation of seating and providing bearing end play within known tolerance limits.

Compared to conventional practice, it will be seen from the foregoing that the manufacturing operations of necking the end of a wheel spindle to accommodate a slotted head bolt has been eliminated; along with the operation of drilling a transaxial cotter pin hole through the spindle. In addition, the thrust washer, slotted head bolt and cotter pin have been eliminated from the assembly. The same degree of adjustment afforded by the conventional mechanism is provided in the present invention with considerably fewer manufacturing steps and a minimum number of large rugged parts. The mounting attachment of hub 48 to the implement frame not only provides mounting support for both ends of the wheel spindle, but also simultaneously locks the bearing members in their axial operating position.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An assembly for mounting a wheel hub on an agricultural machine or the like, said assembly comprising a spindle, anti-friction bearing means carried on said spindle and movable axially therealong, a wheel hub carried by said bearing means whereby said bearing means is interposed radially between said spindle and said wheel hub, a first spindle mounting hub fixedly carrying said spindle and disposed on one axial side of said bearing means, said first spindle mounting hub limiting axial movement of said bearing means along said spindle in the axial direction toward said first spindle mounting hub, means fixedly mounting said first spindle mounting hub on a frame to support said spindle on one side of said wheel hub, said spindle having a threaded end portion disposed axially beyond the side of said bearing means opposite said one side, a second spindle mounting hub threaded on said threaded end portion of said spindle for rotation about the spindle axis and accompanying axial movement toward and away from said bearing means to establish proper axial positioning of said bearing means on said spindle, means for fixedly attaching said second spindle mounting hub on said frame substantially in any angular position about the axis of said spindle required for proper axial positioning of said bearing means to provide mounting support for said spindle on the side of said wheel hub opposite said one side and simultaneously fix said second spindle mounting hub in the angular position affording proper axial positioning of said bearing means, said means for fixedly attaching said second spindle mounting hub to said frame comprising an annular series of bolt holes in said frame lying on a circle concentric to said spindle axis, a plurality of bolt holes in said second spindle mounting hub lying on said circle when said second spindle mounting hub is threaded on said spindle whereby upon rotation of said second spindle mounting hub, the bolt holes in said hub may be selectively aligned with various bolt holes in said annular series, and mounting bolts insertable in the aligned holes in said hub and frame to fixedly attach said second spindle mounting hub to said frame.

2. An assembly for mounting a wheel hub on an agricultural machine or the like, said assembly comprising a spindle, means fixedly mounting one end of said spindle on a frame, a roller bearing having separable inner and outer rings and an annular series of rollers interposed between said inner and outer rings, said inner ring being carried on said spindle and movable axially along the spindle, a wheel hub carried on said outer ring, stop means on said wheel hub engaging one axial side of said outer ring and preventing relative axial movement in said one direction between said wheel hub and said outer ring, said spindle having a threaded portion at the end thereof opposite said one end and disposed axially beyond the side of said outer ring opposite said one side, a spindle mounting hub threaded on said threaded portion of said spindle and operatively engaging said inner ring on the axial side thereof opposite said one side whereby rotation of said spindle mounting hub about the spindle axis moves said inner ring axially relative to said annular series of rollers to establish proper operative engagement between said bearing inner and outer rings and said rollers, means for fixedly attaching said spindle mounting hub to said frame substantially in any angular position about said spindle axis determined by the establishment of proper operating engagement of said bearing inner and outer rings and said rollers thereby supporting the threaded end of said spindle on said frame and simultaneously locking said bearing rings and rollers in proper operative engagement, said means for fixedly attaching said spindle mounting hub to said frame comprising an annular series of bolt holes in said frame lying on a circle concentric to said spindle axis, a plurality of bolt holes in said spindle mounting hub lying on said circle when said hub is threaded on said spindle whereby the bolt holes in said hub may be selectively aligned with various bolt holes in said annular series by rotation of said spindle mounting hub about the axis of said spindle, and mounting bolts insertable in the aligned holes in said hub and frame to fixedly attach said hub to said frame.

References Cited

UNITED STATES PATENTS

| | | | |
|---|---|---|---|
| 644,771 | 3/1900 | Kimball | 308—190 |
| 675,617 | 6/1901 | Bartholomew | 308—211 |
| 721,931 | 3/1903 | Baker | 308—190 |
| 1,457,653 | 6/1923 | Cerrato | 308—16 |
| 2,032,490 | 3/1936 | Moore | 308—211 X |
| 2,275,302 | 3/1942 | Magnuson | 301—132 X |
| 2,668,597 | 2/1954 | King. | |
| 2,704,233 | 3/1955 | Schjolin et al. | 308—211 |
| 2,711,936 | 6/1955 | Rhine | 308—211 |

MARTIN P. SCHWADRON, *Primary Examiner.*

R. F. HESS, F. SUSKO, *Assistant Examiners.*